Figure 1:
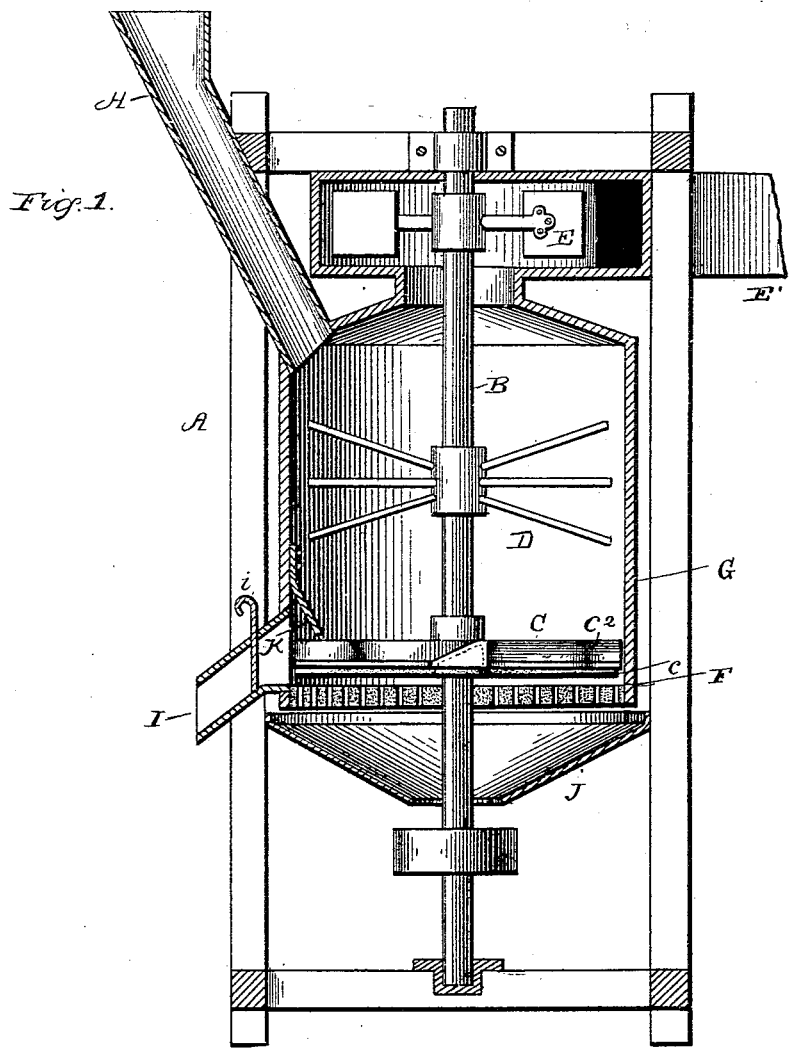

(No Model.)

J. J. FAULKNER.
COTTON SEED DELINTER.

No. 555,311.　　　　　　　Patented Feb. 25, 1896.

Witnesses
Victor J. Evans.
Marie Wilson

Inventor
James J. Faulkner.
E. M. Marble & Sons
Attorneys

United States Patent Office.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 555,311, dated February 25, 1896.

Application filed June 20, 1895. Serial No. 553,426. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter whose construction and arrangement of parts will be hereinafter described and particularly pointed out in the claims.

In all machines which are designed for treating cotton-seed the difference between the specific gravity of the uncleaned seed and the cleaned seed must be constantly remembered, as it largely influences the character and efficiency of any treatment to which the seed is subjected. It can be relied upon with perfect certainty that if a mass of uncleaned seed and cleaned seed be thrown together into a receptacle and the seed be agitated so as to allow the same to have a free movement the cleaned seed will fall to the bottom of the receptacle and the uncleaned seed remain on top, while if any partly-cleaned seed be in the receptacle such seed will lie toward the bottom of the same, next above the cleaned seed itself. I have constructed a machine which utilizes this principle and in which the abrading action takes place between the bottom of an upright cylinder and a rotating spider arranged to rotate in sufficiently close proximity to the bottom to enable an abrading action to take place. The bottom of the cylinder may be and preferably is covered with emery, and it is preferably perforated in order to enable the escape therethrough of any dirt or impurity. The under surface of the revolving spider is emery-coated. Thus two abrading-surfaces are produced, which act to remove the lint from the surface of the seed brought under the influence thereof. A peripheral discharge-opening is provided for the seed, through which it can escape in quantities regulated by its condition. To prevent the escape through the same of only partially-cleaned stock, a guard-plate is used, which projects downwardly from a portion of the inner surface of the cylinder and prevents the seed occupying the body of the said cylinder from having access to the discharge-opening. Seed is fed into the cylinder through an opening in the top thereof and is constantly agitated by an agitator stationed on a central shaft, so that the seed will not mat or gather in large masses and so that removal of the lint, which is separated by the action of the machine, and which constantly tends of itself to rise to the top of the body of the seed in the machine, can be effected by an upward air-current. This air-current is caused by a fan stationed at the top of the machine and discharges lint and fine dirt into an air-flume.

My invention is fully described in the drawings which accompany and form a part of this application, in which the same reference-letters refer to the same or corresponding parts, and in which—

Figure 2:
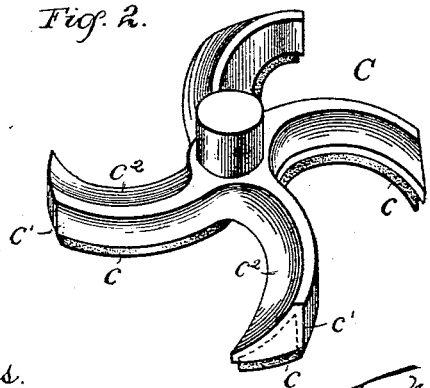

Figure 1 is a central vertical section of my machine, and Fig. 2 a detail view of the revolving spider.

Referring to the drawings, A represents the machine-frame, in which is journaled the central power-shaft B. On the power-shaft B are mounted the revolving spider C, the agitator D, and the exhaust-fan E.

The spider C revolves in close proximity to the bottom F of the cylinder G, which cylinder serves as a receptacle for the seed, and into which seed is fed through the feed-spout H and discharged through the discharge-spout I, the discharge being controlled by a valve *i*. The lower surface of the revolving spider is emery-coated, the preferable construction of such spider being to secure abrading-blocks *c* between downwardly-sloping flanges *c'* on the under surface of the spider. The top surface of the bottom F is also preferably emery-coated, and to permit the removal of coarse dirt from the machine I make such bottom perforated, as shown, the coarse dirt falling onto the inclined plates J and escaping from the machine.

The seed, which is fed to the machine through the feed-spout H and falls into the receptacle afforded by the cylinder G, is constantly agitated and prevented from collecting into large lumps or masses by the agitator D and naturally arranges itself in layers, according to the specific gravity of the seed, the heavier seed occupying the bottom of the cylinder and the lighter seed lying on top of the stock. The bottom layers of seed are exposed to the action of the abrading-surfaces by reason of the movement of the revolving spider, the inclined upper face $e^2$ thereof assisting in the agitation of the seed. As rapidly as the scouring action takes place, the lint removed from the seed is drawn upward by the air-current caused by the exhaust-fan E and escapes through the air-flume E'. The seed, as rapidly as it becomes cleaned, is discharged through the discharge-spout I, the valve $i$ controlling the discharge and regulating it so that only cleaned seed shall be discharged. To prevent uncleaned seed from escaping through this discharge-opening, I may use a guard-plate K, which projects downward from the inner surface of the cylinder G and effectually closes the discharge-opening to the uncleaned seed.

The operation of my machine is as follows: Seed is fed to the machine through the feed-spout E, and falling into the receptacle afforded by the cylinder G is constantly agitated by the agitator D and finally swept under the revolving spider C by the action of the inclined upper surface of the same. The abrading action takes place between the lower surface of the revolving spider and the upper surface of the perforated emery-coated bottom F of the cylinder G. Coarse dirt and like impurities are ground to dust during this abrading action and fall through the perforations in the bottom F, escaping from the machine. The seed, as rapidly as it becomes thoroughly cleansed, is discharged through the discharge-spout I in quantities regulated by the position of the valve $i$. The guard-plate K serves to prevent the uncleaned seed from passing through such opening.

The machine which I have thus described is exceedingly simple in construction and can be set up and operated in places where larger machines would not be profitable. Its operation is very complete and the quality of seed delivered therefrom is entirely satisfactory.

Having thus fully described my invention, what I claim as new, and desire to secure by Letters Patent, is—

1. In a cotton-seed delinter, the combination with a chamber having a perforated abrading-surfaced bottom, an air-flume at the top, and means for causing an upward air-current to pass through said chamber, of seed-cotton inlet and discharge openings, a central shaft and a spider mounted thereon and operating above said perforated bottom, the under surfaces of the arms of said spider being formed with abrading-surfaces, substantially as described.

2. In a cotton-seed delinter, the combination with a chamber having a perforated bottom, an air-flume at the top, and means for causing an upward air-current to pass through the chamber, of seed inlet and discharge openings, a revolving abrading-surface, formed to permit free passage of air therethrough, operating above said bottom, and an agitator stationed within the chamber, substantially as described.

3. In a cotton-seed delinter, the combination with a chamber having a bottom, and a revolving abrading-surface operating above the same, of a seed-inlet opening at the top of the chamber, a seed-discharge opening near the bottom of the same, and means for preventing the escape of uncleaned seed through the same, substantially as described.

4. In a cotton-seed delinter, the combination with a chamber having a bottom, and a revolving abrading-surface operating above the same, of a seed-inlet opening at the top of the chamber, a seed-discharge opening near the bottom of the same, and a guard-plate, stationed above the revolving abrading-surface and over said discharge-opening, for preventing the escape of uncleaned seed through the same, substantially as described.

In testimony whereof I affix my signature in presence of two witnesses.

JAMES J. FAULKNER.

Witnesses:
C. L. BERLIN,
JOHN HALLUM.